United States Patent
Green

(10) Patent No.: US 9,910,763 B1
(45) Date of Patent: Mar. 6, 2018

(54) TEST CASE REDUCTION IN APPLICATION BINARY INTERFACE (ABI) COMPATIBILITY TESTING

(71) Applicant: International Business Machines Corporation, Armonk, NY (US)

(72) Inventor: Robin Green, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 15/240,167

(22) Filed: Aug. 18, 2016

(51) Int. Cl.
  G06F 9/44 (2006.01)
  G06F 11/36 (2006.01)

(52) U.S. Cl.
  CPC ...... *G06F 11/3672* (2013.01); *G06F 11/3684* (2013.01)

(58) Field of Classification Search
  CPC ............... G06F 11/3672; G06F 1/3684; G06F 11/3688; G06F 11/3664
  USPC .......................................................... 717/124
  See application file for complete search history.

(56) References Cited

U.S. PATENT DOCUMENTS

| | | | | |
|---|---|---|---|---|
| 7,237,231 B2* | 6/2007 | Lambert | ............. | G06F 11/3684 714/38.14 |
| 2009/0070746 A1* | 3/2009 | Dhurjati | ............. | G06F 11/3676 717/128 |
| 2013/0019126 A1* | 1/2013 | Frohlich | ............. | G06F 11/3688 714/38.1 |
| 2014/0282411 A1* | 9/2014 | Liemandt | ............. | G06F 11/3672 717/124 |

FOREIGN PATENT DOCUMENTS

CN 103136103 A 6/2013

OTHER PUBLICATIONS

Vidács et al., "Test Suite Reduction for Fault Detection and Localization: A Combined Approach." MTA-SZTE Research Group on Artificial Intelligence*, University of Szeged. Feb. 2014. (10 pgs).

* cited by examiner

*Primary Examiner* — Anna Deng
(74) *Attorney, Agent, or Firm* — Cantor Colburn LLP; William A. Kinnaman, Jr.

(57) ABSTRACT

A method and a system of test case reduction in application binary interface (ABI) compatibility testing are provided. The computer-implemented method includes generating test cases consisting of called functions with random numbers and types of arguments, validating that the arguments are correctly passed to the called functions, and, where it is found that arguments are not correctly passed, iteratively narrowing down the set of arguments required to find the minimal number and types of arguments to demonstrate an error in the ABI implementation.

18 Claims, 4 Drawing Sheets

US 9,910,763 B1

TEST CASE REDUCTION IN APPLICATION BINARY INTERFACE (ABI) COMPATIBILITY TESTING

BACKGROUND

The subject matter disclosed herein generally relates to test case reduction and, more particularly, to test case reduction in ABI compatibility testing.

Many operating systems include an Application Binary Interface (ABI) that defines the interface between a calling function and the function that is the target of the call. For example, the ABI may define when arguments are passed in memory versus in registers for particular data types or data sizes. Errors can occur when a compiler is ported to a new operating system and therefore needs to support a new ABI, or when a new compiler is created for an existing operating system.

To ensure proper testing of the ABI a number of test cases can be written or automatically generated. The test cases are run to test and ensure that all parameters and return arguments are passed correctly between the calling and called functions and can include a large variety of parameters and return types. When an error is detected, it is often in a function containing a large number of randomized arguments, and it can be a challenging and manual process to iteratively remove arguments from the called function (on both the caller and callee side) until the minimal set of arguments that cause a failure are found. Without this minimal set, it is very difficult for the developer to diagnose what aspect of the ABI the compiler has failed to correctly implement.

Further, current techniques for reducing the set of arguments to those that produce the error are time consuming because the removal process is cumbersome and the removal may change the underlying logic causing detection errors. Specifically, when an argument is removed from the function, it is removed from at least three places: the function call in the caller, the function definition in the callee, and the function declaration in the header file. Additionally, when an argument is removed, the logic of the function itself may change, and manual steps may be required to remove all uses of that argument from the called function. Further, once all instances of the argument are removed from the called function, the logic of the function may change and the ability of the function to validate that parameters were passed correctly is compromised, requiring further manual work to correct any errors.

Accordingly, test case reduction in ABI compatibility testing is desired through a method and system of determining a minimal set of arguments that cause the event that the test case is testing for.

BRIEF DESCRIPTION

According to one embodiment, a computer-implemented method of test case reduction in application binary interface (ABI) compatibility testing is provided. The computer-implemented method including receiving, from a memory at a processor, a failed test case and a plurality of arguments that were the cause of a failure of the failed test case, selecting, using the processor, a first subset of arguments from the plurality of arguments, running, using the processor, a copy of the failed test case without the first subset of arguments, omitting, using the processor, the first subset of arguments from the copy of the failed test case based on a determination that the copy of the failed test case continues to fail, and retaining, using the processor, the first subset of arguments based on a determination that the copy of the failed test case passes indicating that the first subset of arguments contain arguments that trigger the failure.

In addition to one or more of the features described above, or as an alternative, further embodiments may include iteratively selecting, using the processor, a plurality of subsets of the plurality of arguments and omitting when the copy of the failed test case continues to fail until all arguments in the plurality of arguments have been screened.

In addition to one or more of the features described above, or as an alternative, further embodiments may include storing, in the memory, the remaining plurality of arguments that has arguments omitted as a minimal set of arguments that cause the failure of the failed test case.

In addition to one or more of the features described above, or as an alternative, further embodiments may include generating, using the processor, a plurality of test cases that each include a function call and a target function, generating, using the processor, a plurality of arguments for each of the plurality of test cases, executing, using the processor, the plurality of test cases using the plurality of arguments, detecting, using the processor, a set of failed test cases from the plurality of test cases, and selecting, using the processor, a failed test case from the set of failed test cases.

In addition to one or more of the features described above, or as an alternative, further embodiments may include generating the copy of the failed test case based on a random number generator seeded by a seed value that was used to generate the failed test case initially.

In addition to one or more of the features described above, or as an alternative, further embodiments may include detecting a randomly generated failed test case, receiving the seed value of the randomly generated failed test case, regenerating the failed test case using the seed value, and storing the regenerated failed test case as the copy of the failed test case in memory.

In addition to one or more of the features described above, or as an alternative, further embodiments may include, wherein selecting the first subset of arguments from the plurality of arguments includes defining a plurality of states of arguments, assigning each argument in the plurality of arguments a state, and selecting the first subset of arguments based on the state of each argument.

In addition to one or more of the features described above, or as an alternative, further embodiments may include, wherein defining the plurality of states of arguments including defining an omit state wherein an argument is known not to be required to produce a failure, defining an inclusive state wherein an argument is known to be required to produce a failure, defining a test state wherein an argument in this state is to be tested as one possibly not required to produce a test case failure, and defining an assumed inclusion state wherein an argument is assumed to be required to produce a failure.

In addition to one or more of the features described above, or as an alternative, further embodiments may include, wherein defining the plurality of states of arguments further includes representing the omit state by a first character, representing the inclusive state by a second character, representing the test state by a third character, and representing the assumed inclusion state by a fourth character.

According to another embodiment, a computer program product for test case reduction in application binary interface (ABI) compatibility testing is provided. The computer program product including a computer readable storage medium having program instructions embodied therewith.

The program instructions executable by a processor to cause the processor to receive, from a memory at a processor, a failed test case and a plurality of arguments that were the cause of a failure of the failed test case, select, using the processor, a first subset of arguments from the plurality of arguments, run, using the processor, a copy of the failed test case without the first subset of arguments, omit, using the processor, the first subset of arguments from the copy of the failed test case based on a determination that the copy of the failed test case continues to fail, and retain, using the processor, the first subset of arguments based on a determination that the copy of the failed test case passes indicating that the first subset of arguments contain arguments that trigger the failure.

In addition to one or more of the features described above, or as an alternative, further embodiments may include program instructions executable by the processor to cause the processor to iteratively select, using the processor, a plurality of subsets of the plurality of arguments and omitting when the copy of the failed test case continues to fail until all arguments in the plurality of arguments have been screened.

In addition to one or more of the features described above, or as an alternative, further embodiments may include program instructions executable by the processor to cause the processor to store, in the memory, the remaining plurality of arguments that has arguments omitted as a minimal set of arguments that cause the failure of the failed test case.

In addition to one or more of the features described above, or as an alternative, further embodiments may include program instructions executable by the processor to cause the processor to generate, using the processor, a plurality of test cases that each include a function call and a target function, generate, using the processor, a plurality of arguments for each of the plurality of test cases, execute, using the processor, the plurality of test cases using the plurality of arguments, detect, using the processor, a set of failed test cases from the plurality of test cases, and select, using the processor, a failed test case from the set of failed test cases.

In addition to one or more of the features described above, or as an alternative, further embodiments may include program instructions executable by the processor to cause the processor to generate the copy of the failed test case based a random number generator seeded by a seed value that was used to generate the failed test case initially.

In addition to one or more of the features described above, or as an alternative, further embodiments may include program instructions executable by the processor to cause the processor to detect a randomly generated failed test case, receive the seed value of the randomly generated failed test case, regenerate the failed test case using the seed value, and store the regenerated failed test case as the copy of the failed test case in memory.

In addition to one or more of the features described above, or as an alternative, further embodiments may include program instructions executable by the processor to cause the processor to define a plurality of states of arguments, assign each argument in the plurality of arguments a state, and select the first subset of arguments based on the state of each argument.

In addition to one or more of the features described above, or as an alternative, further embodiments may include program instructions executable by the processor to cause the processor to define an omit state wherein an argument is known not to be required to produce a failure, define an inclusive state wherein an argument is known to be required to produce a failure, define a test state wherein an argument in this state is to be tested as one possibly not required to produce a test case failure, and define an assumed inclusion state wherein an argument is assumed to be required to produce a failure.

In addition to one or more of the features described above, or as an alternative, further embodiments may include program instructions executable by the processor to cause the processor to represent the omit state by a first character, represent the inclusive state by a second character, represent the test state by a third character, and represent the assumed inclusion state by a fourth character.

According to another embodiment, a system for test case reduction in application binary interface (ABI) compatibility testing is provided. The system including a memory having computer readable instructions, and a processor configured to execute the computer readable instructions, the computer readable instructions including receiving, from the memory at the processor, a failed test case and a plurality of arguments that were the cause of a failure of the failed test case, selecting, using the processor, a first subset of arguments from the plurality of arguments, running, using the processor, a copy of the failed test case without the first subset of arguments, omitting, using the processor, the first subset of arguments from the copy of the failed test case based on a determination that the copy of the failed test case continues to fail, and retaining, using the processor, the first subset of arguments based on a determination that the copy of the failed test case passes indicating that the first subset of arguments contain arguments that trigger the failure.

In addition to one or more of the features described above, or as an alternative, further embodiments may include a computer readable program including iteratively selecting, using the processor, a plurality of subsets of the plurality of arguments and omitting when the copy of the failed test case continues to fail until all arguments in the plurality of arguments have been screened.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
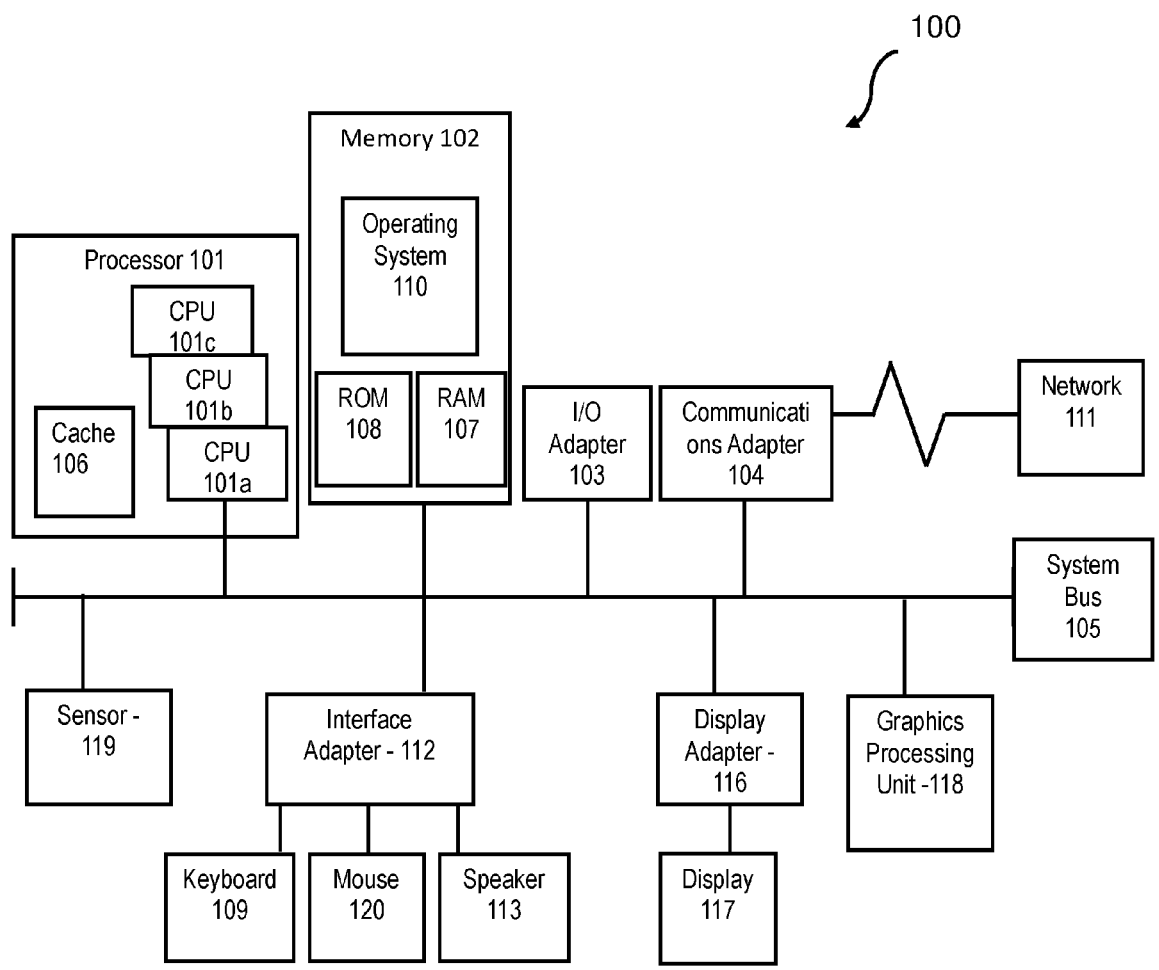
FIG. 1 depicts a block diagram of a computer system for implementing some or all aspects of the system, according to some embodiments.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to taking a failing test case that was produced by a test case generator, and automatically narrowing it down to the smallest set of source code instructions, and the smallest set of function arguments, required to produce a failure.

Specifically, embodiments described herein are directed to a method and a system of test case reduction in application binary interface (ABI) compatibility testing. The computer-implemented method includes generating test cases consisting of called functions with random numbers and types of arguments, validating that the arguments are correctly passed to the called functions, and, where it is found that arguments are not correctly passed, recursively narrowing down the set of arguments required to find the minimal number and types of arguments to demonstrate an error in the ABI implementation For example, according to one or more other embodiments of the present disclosure, a method of test case reduction in an ABI is provided as follows. Initially, a test case generator generates large volumes of function calls, from a main function stored in one source file, to functions in another file. The generator also generates the logic in the called function that reads the passed in arguments, performs some computations (to prevent a compiler optimizer from ignoring argument contents, thus potentially missing an argument passing error), and returns a result. That same logic is placed in the main function so that the final computation in the main and called functions can be compared. If these two final computations are identical, it is assumed all arguments were passed correctly. If the two computations do not match, the main function prints an error message showing the disparate results.

According to one or more embodiments, once testing has revealed a problem, the test case generator can regenerate only the single function call in main, and the single function, where the failure occurred, to validate that the failure occurs with just that one function (in some cases, the problem may only occur if a previous function was called first).

Once the tester or automated test harness has confirmed that the single call produces the error, the test case generator can iteratively generate new versions of the same function call in main, and called function, in which selective arguments are omitted from both the function argument list, and from the logic of the main and called functions, until the minimal set of arguments is found that exposes the ABI problem.

Turning now to FIG. 1, an electronic computing device 100, which may also be called a computer system 100, that includes a plurality of electronic computing device sub-components is generally shown in accordance with one or more embodiments. Particularly, FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 120, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Specifically, the operating system 110 can include an Application Binary Interface (ABI) that defines the interface between a calling function and the function that is the target of the call. For example, the ABI may define when arguments are passed in memory versus in registers for particular data types or data sizes.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 120. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, the electronic computing device 100 includes the operating system 110 that can include the Application Binary Interface (ABI) that defines the interface between a calling function and the function that is the target of the call. For example, the ABI may define when arguments are passed in memory 102 versus in registers, which may be located in the cache 106, for particular data types or data sizes. As noted above, proper testing of the ABI in the operating system 110 is provided by implementing a plurality of test cases that are each provided with a plurality of arguments. Then when a test case fails, additional processing as provided in the embodiments disclosed herein allows for a reduction of the arguments to the minimal set that cause the failure of the test case. Specific examples of this are provided in the following figures and specification.

Figure 2:
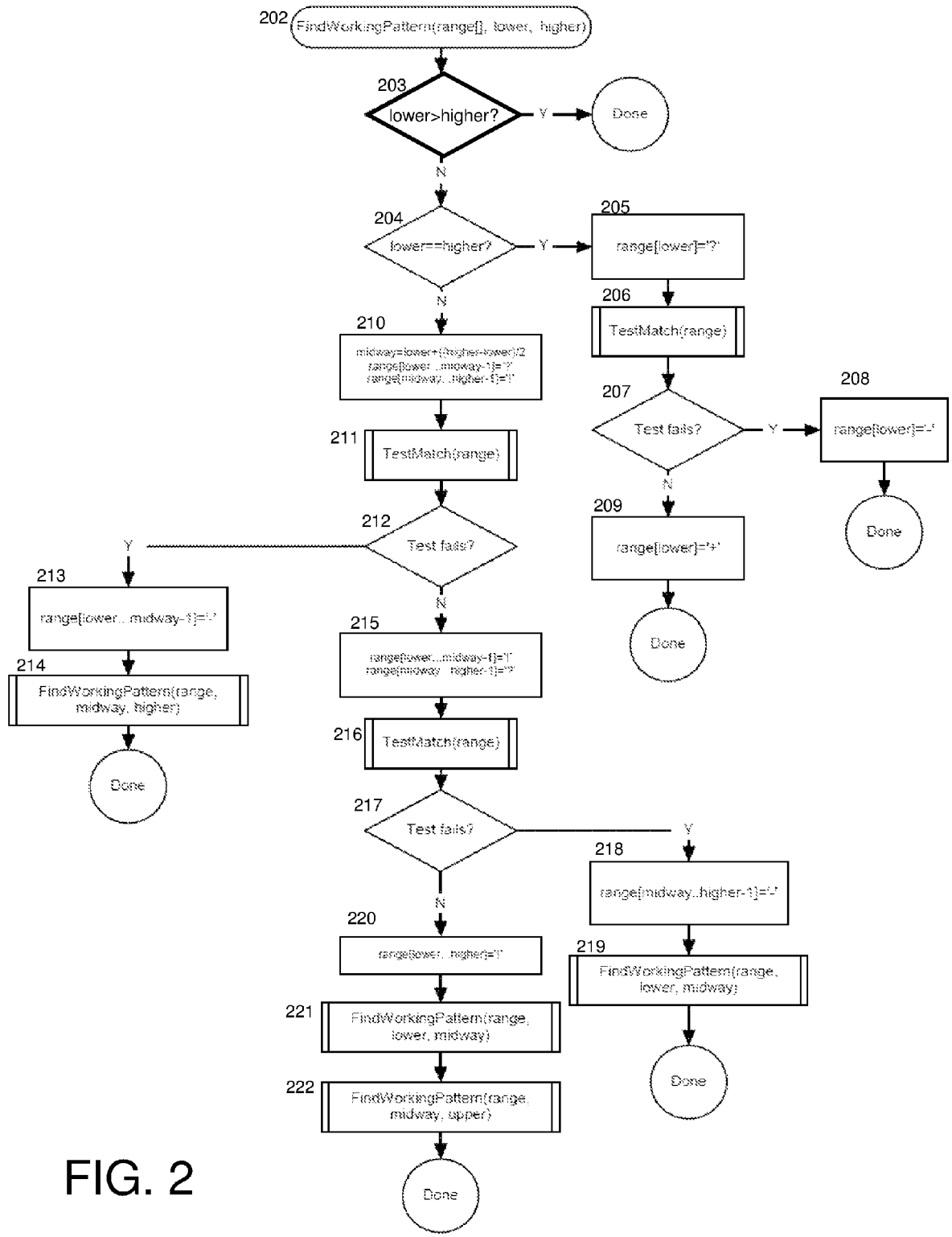
FIG. 2 is a flowchart of a method of test case reduction in accordance with one or more embodiments.

For example, turning now to FIG. 2, this figure is a flowchart of a method of test case reduction is shown in accordance with one or more embodiments of this disclosure.

The method call 202 for the method used to obtain the minimal set of passing arguments is titled "FindWorkingPattern" 202. FindWorkingPattern can be a function to determine the minimum set of required arguments to produce a failure. The input arguments to this method include a character array "range", and two integers, lower and higher.

The character array "range", consists of one character per argument in the original test case function. Each position in range can contain one of four characters: "−", meaning the argument is known not to be required to produce a failure; "+", meaning the argument is known to be required to produce a failure; "?", meaning the argument is being tested as one possibly not required to produce a failure; and "!", meaning the argument is assumed to be required to produce a failure.

The two integers, lower and higher, identify the first position in range to check, and the first position after the checked area (i.e. the element after the highest element to check).

The method can begin by checking if the lower integer value is greater than the higher integer value 203, and if the lower integer is greater, then a return from the function follows as there is nothing to test. If there are values to test then the methods moves on to operation 204. Specifically, if the lower value is equal to the higher integer value 203, then the method sets the element at range[lower] to "?" at operation 205, which is a test to determine if the argument can be omitted.

The method next calls a "TestMatch" function 206 which provides an output of true or false depending if the test fails or passes. For example, "TestMatch" is a function that generates a new copy of the test case using the test case random value seed already used to generate the original test function, in which all "−" or "?" arguments are omitted and all other arguments are used when running the test. Next, based on the output of "TestMatch" 207 if the test case fails, the method sets that element to '-' because it is known that it can be omitted 208. Otherwise the method sets that element to '+' because it is known that it is required 209.

Returning to operation 204, if the lower is at least one less than higher a midway value is calculated that is a midway point between lower and higher 210. Further in this operation the operation also sets all characters in range from lower to midway (exclusive) to "?" and sets all characters in range from midway (inclusive) to higher (inclusive) to '!'. Next the method again calls the testing function TestMatch 211 providing the input of the current range values that need tested. Particularly the operation 212 generates a new copy of the test case in which all "−" or "?" arguments are omitted. If the test case fails then the method sets all characters in range from lower to midway (exclusive) to "−" because they are known not to be required for the test case to fail 213. Next the method recursively call findWorkingPattern with the range, providing midway as the lower value, and higher as the higher value, and returns when done 214.

Otherwise if the test does not fail at operation 212 the method sets all characters in range from lower to midway (exclusive) to '!' and sets all characters in range from midway (inclusive) to higher (inclusive) to '?' 215. Next the method calls the TestMatch function 216 to test the test case with the updated range values. Specifically, the TestMatch function 216 generates a new copy of the test case in which all "−" or "?" arguments are omitted and runs the test returning an output that indicates if the test case fails or passes.

If the test case fails the method sets all characters in range from midway (inclusive) to higher (exclusive) to "−" because they are known not to be required 218. Next, the method recursively calls findWorkingPattern 219 with the range as the input, providing lower as the lower value, and midway as the higher value, and returns when done.

Otherwise, when the test case testing does not fail at 217, this indicates that there are arguments in each of (lower, midway−1) and (midway, higher−1) that are required, so the method sets all elements from lower to higher to "!" 220, and calls findWorkingPattern twice (221 and 222), once with lower and midway as the elements of range to test 221, and once with midway and higher as the elements of range to test 222.

According to one or more embodiments, the algorithm used to generate an ABI test case allows for easy regeneration of the same test case, with the same logic, except for that involving omitted arguments, by distinguishing between a generated argument (pseudo-randomly produced) and an emitted argument (one that is emitted into the resulting test case main and target functions).

For example, a specific embodiment of the algorithm used includes the following operations. Initially a random number generator (RNG) is seeded with the function number, so that it reliably produces the same random outputs on each call to it (calls to the RNG are used to determine number of arguments to generate, type of each argument, name of each argument, other details of complex arguments such as structures, unions, or arrays, and logic used to compute results from arguments).

Further, according to one or more embodiments, in order to generate many different test cases, a random number generator is used that is typically seeded at 0 at the start of test case generation. As each additional function is generated, the seed is incremented by 1, and the random number generator is re-seeded, so that function 0 is generated from a RNG seeded at 0, function 1 by a RNG seeded at 1, and so on. A reason for seeding in this way includes: 1) A large number of functions can be generated together (function 0 . . . function 1000) and tested; 2) when a given function, for example function 323, is found to fail, it can be regenerated on its own, with 0 or more arguments omitted to narrow down the minimal subset of failing arguments by passing in both the seed (323) and the omit arguments.

Further, all arguments are generated within the test case generator each time, and all logic within the main function and the called function is generated within the test case generator each time.

Each programmatic statement is tested against the list of omitted arguments to determine if the statement should be emitted. Any programmatic statement containing arguments that are omitted is not emitted, while any programmatic statement not containing arguments that are omitted is emitted.

Figure 3:
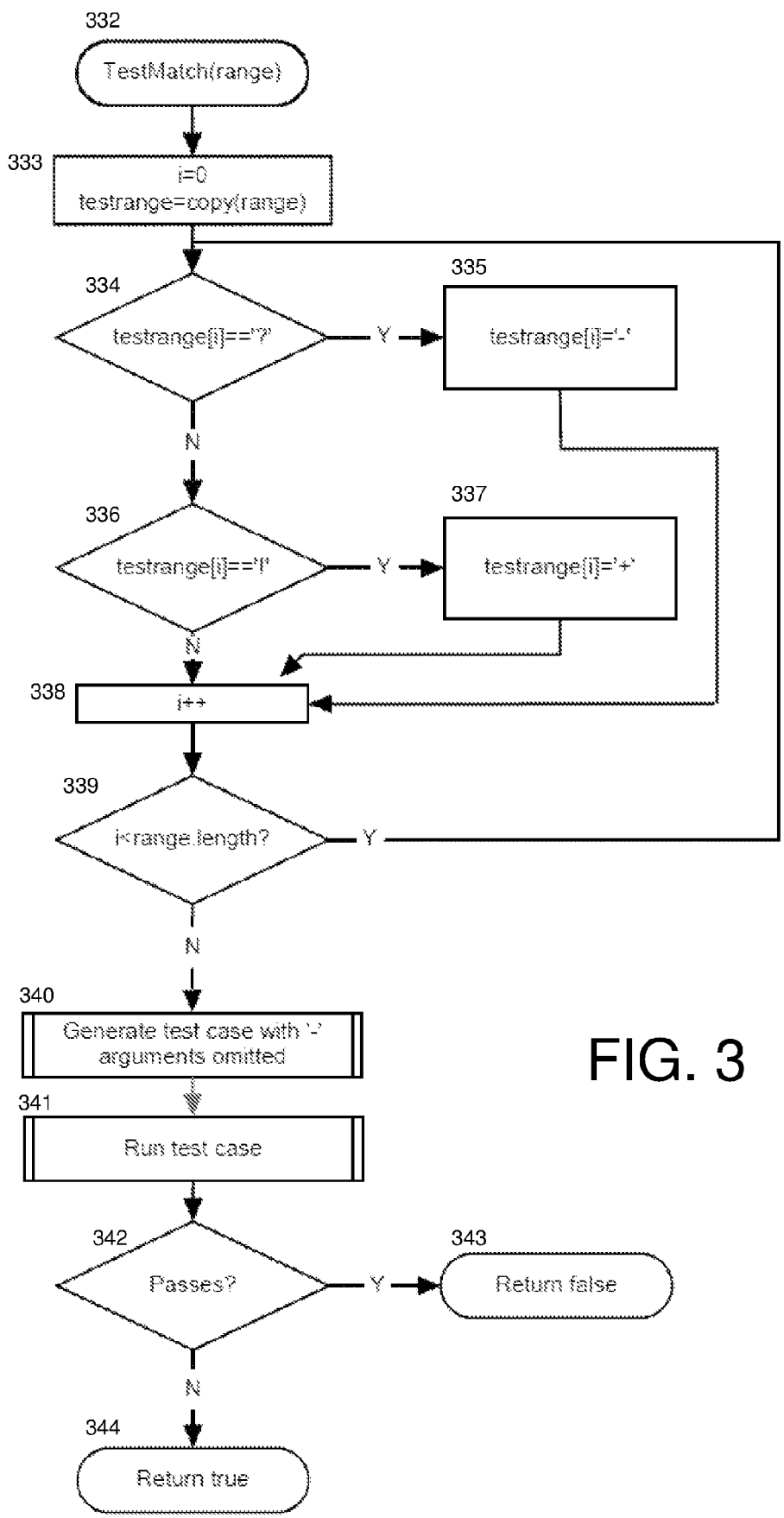
FIG. 3 is a flowchart of a subroutine used in a method of test case reduction in accordance with one or more embodiments.

Further, FIG. 3 is a flowchart of a subroutine used in a method of test case reduction in accordance with one or more embodiments of this disclosure. Specifically, the TestMatch function is shown which is used in the above described method findWorkingPattern. This subroutine method begins by receiving the range to be tested 332. Next the subroutine generates a copy of the range and sets a counter to zero 333. The subroutine then looks at the data at position "i" in the copied range and changes to "?" 334, meaning the argument is being tested as one possibly not required to produce a failure to "−" 335, meaning the argument is known not to be required to produce a failure. Further, the function changes "!" 336, meaning the argument is assumed to be required to produce a failure to "+" 337, meaning the argument is known to be required to produce a failure. The subroutine method then increments the counter "i" 338. Then the subroutine method checks to see if the counter is less than the length of the range 339 and if it is not it continues to iterate through the copy of the range adjusting all argument with '?' to '−' and '!' to '+' for test purposes (operations 334, 335, 336, and 337). Once all arguments in the range copy are updated accordingly, the subroutine method goes on to generate a test case with the '−' arguments omitted 340. Then the subroutine method runs the test case 341 and checks to see if it passes 342. If the test case passes this subroutine method returns a false value 343 indicating the arguments omitted cause the failure and should remain included and if it does not pass it returns a true value 344 indicating that the arguments omitted are not causing the failure and can be omitted.

Figure 4:
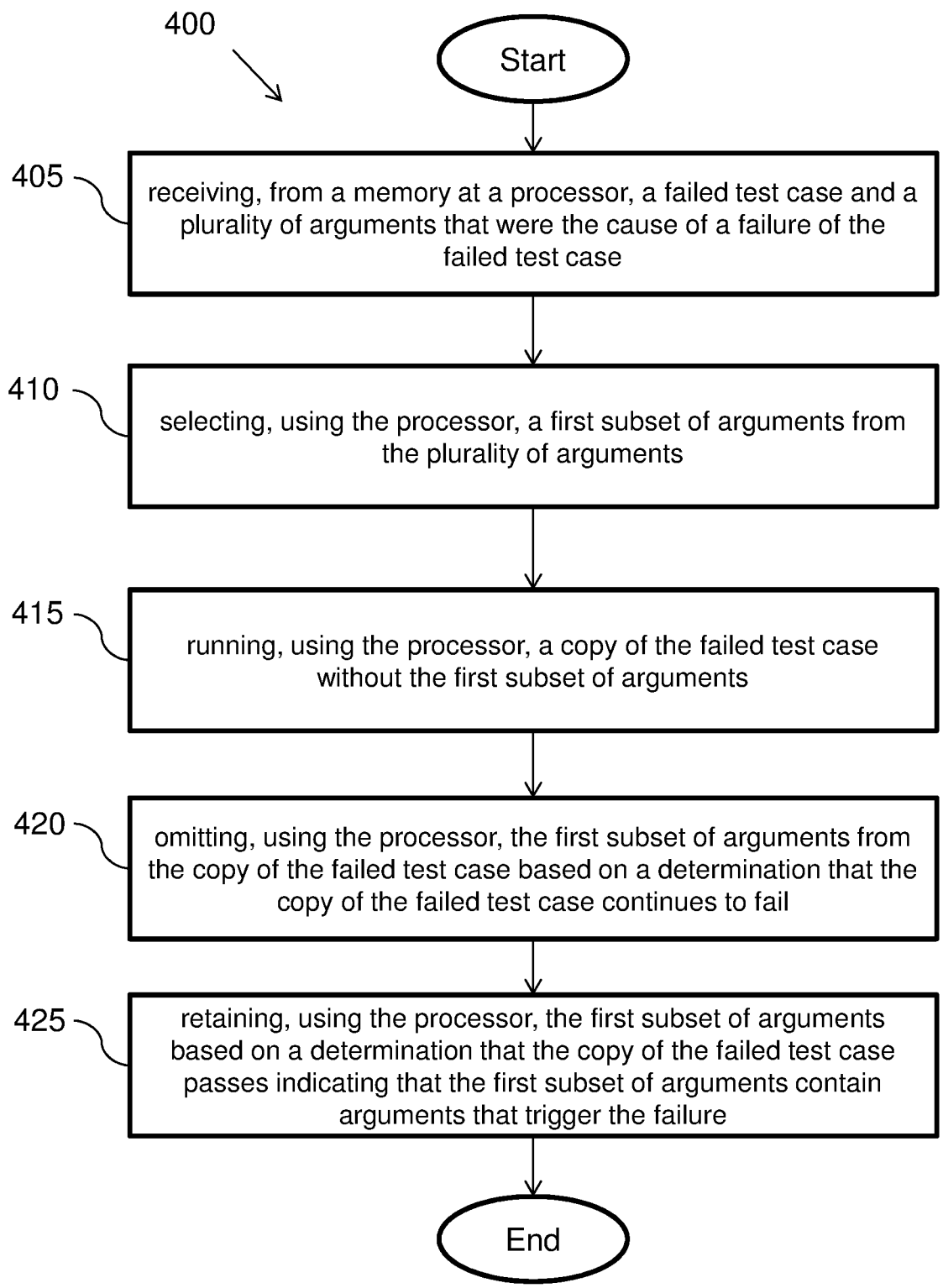
FIG. 4 is a diagram of a method of test case reduction in accordance with one or more embodiments.

FIG. 4 is a flowchart of a method 400 of test case reduction in accordance with one or more embodiments of this disclosure. The method 400 includes receiving, from a memory at a processor, a failed test case and a plurality of arguments that were the cause of a failure of the failed test case (operation 405). The method 400 further includes selecting, using the processor, a first subset of arguments from the plurality of arguments (operation 410). The method 400 also includes running, using the processor, a copy of the failed test case without the first subset of arguments (operation 415). The method 400 includes omitting, using the processor, the first subset of arguments from the copy of the failed test case based on a determination that the copy of the failed test case continues to fail (operation 420). Finally, the method 400 includes retaining, using the processor, the first subset of arguments based on a determination that the copy of the failed test case passes indicating that the first subset of arguments contain arguments that trigger the failure (operation 425).

According to another embodiment, the method can further include recursively selecting, using the processor, a plurality of subsets of the plurality of arguments and omitting when the copy of the failed test case continues to fail until all arguments in the plurality of arguments have been screened. The method can also further include storing, in the memory, the remaining plurality of arguments that has arguments omitted as a minimal set of arguments that cause the failure of the failed test case.

According to another embodiment, the method can further include generating, using the processor, a plurality of test cases that each include a function call and a target function, generating, using the processor, a plurality of arguments for each of the plurality of test cases, executing, using the processor, the plurality of test cases using the associated plurality of arguments, detecting, using the processor, a set of failed test cases from the executed plurality of test cases and selecting, using the processor, a failed test case from the set of failed test cases.

Further, according to another embodiment, the method can include generating the copy of the failed test case based on a seed value created by a random number generator that was used to generate the failed test case initially. This can further include detecting the randomly generated failed test case, receiving the seed value of the randomly generated failed test case, regenerating the failed test case using the seed value, and storing the regenerated failed test case as the copy of the failed test case in memory.

According to another embodiment, selecting the first subset can further include defining a plurality of states of arguments, assigning each argument in the plurality of arguments a state, and selecting the first subset of arguments based on the state of each argument. For example, according to an embodiment, the method can include defining an omit state wherein an argument is known not to be required to produce a failure, and defining an inclusive state wherein an argument is known to be required to produce a failure. Further, the method can include defining a test state wherein an argument in this state is to be tested as one possibly not required to produce the test case failure, and defining an assumed inclusion state wherein an argument is assumed to be required to produce a failure.

According to one or more embodiments, each state can be represented by one or more characters. For example, the use of the characters '+', '−', '?', and '!' can be used as the characters used to denote the four states (or according to an embodiment, representing the four states as particular characters). The particular character or string of characters used can be any combination of characters. Thus, the use of '+', '−', '?', and '!' throughout the specification is done for simplicity of explanation but is not meant to limit the invention to these embodiments as different characters can be used. For example, any characters could be used including numbers, letters, or other punctuation marks, or a combination thereof.

In the above embodiments characters were chosen for ease of implementation. According to other embodiments, an array of arbitrary types in which each element of the array denotes one of the four possible states can be used. Therefore, in accordance with other embodiments, an array of integers, or a scalar integer or array of integers with sufficient bits to represent the number of states (4) times the number of arguments, could be used.

For example, according to an embodiment, the method can include defining an omit state indicated by a first character "−" wherein an argument is known not to be required to produce a failure. According to other embodiments this omit state could be represented using any other character or chain of characters. The method further includes defining an inclusive state indicated by a second character "+" wherein an argument is known to be required to produce a failure. Further, the method can include defining a test state indicated by a third character "?" wherein an argument in this state is to be tested as one possibly not required to produce the test case failure, and defining an assumed inclusion state indicated by a fourth character "!" wherein an argument is assumed to be required to produce a failure. The first, second, third, and fourth characters used to represent the states can be changed for other characters or string of characters.

Advantageously, embodiments described herein provide a clear value add to the space of Application Binary Interface testing and have been shown in practice to reduce the time and cost to determine where a problem is and where it needs to be fixed. Currently, this is an exhaustive manual process.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

When developing an operating system a structure is provided that allows programs to have a variety of different procedures. For example a program can include work procedures that process inputs and provide substantive outputs while other procedures are provided that call the work procedures and direct argument storage to and from the work procedures. When calling a procedure, the procedure being called defines its interface including what argument inputs the procedure should receive and what output a user can expect. Accordingly, a system is provided for managing the movement of those arguments to and from the working procedures. Further, in one or more embodiments, an Application Binary Interface (ABI) is provided that defines where arguments get stored and passed through going to and from the called procedure and the calling procedure.

Test procedures exist that are designed to test the calling procedures and working procedures use of the ABI. The test procedure includes generating a number of random test cases that consist of code that generates arguments of random types with random values along with the testing commands.

The test procedure then tests using the generated test cases to see if arguments are correctly received, generates a result, and then tests that the correct result is returned. Typical functions receive, for example four or five arguments, but testing, specifically limit testing, calls in test cases that include, for example, hundreds of arguments, and runs hundreds of such tests cases. This creates a challenge such that it is unclear which of the 100s of arguments having been provided with the test case caused the test case to fail. Further a particular combination and sequence of arguments can cause the failure as well adding to the complexity of detecting a minimal set of arguments that cause a test case failure.

For example, according to one or more embodiments, a process for test case reduction in application binary interface (ABI) compatibility testing can include the following specific operations, but is not limited thereto. The process includes generating multiple sets of three files per set, by a test case generator, wherein the three files comprise a header file containing declarations for all called functions, and declarations for all non-built-in data types (such as, for a language such as C++, classes, structures, and unions) that are used both on a caller side and a callee side. The process uses a main source file containing a single main function, which in turn contains, for each called function, definitions of any variables to be used in the called function, logic to perform computations on arguments and obtain a final result value, a call to the called function with required arguments and validation that the called function returns a same value from computations as a final result value computed in the main function. The process also includes a target source file containing each called function, including: a full argument list and return type. The process uses logic to perform computations on the arguments and obtain the final result value of the target source file, wherein computations are identical to those performed in the main source file, and the result value should be identical when all arguments were passed correctly, and wherein the generation is controlled by a random number generator, seeded with a predetermined value.

The process goes on to include compiling each file into an object file, and linking a main object file and a corresponding target object file together into an executable, wherein calls between the main object file and the corresponding target object file are governed by the ABI. Further, the process includes executing each executable. For any function call with a result that does not match the result computed in the main function, the process includes printing a function name, and printing the final result value computed in the main function and printing the final result value computed in the target source file is also included. Further the process includes regenerating test cases for each individual function that is not correct, by specifying a seed corresponding to that function name, and instructing the test case generator to generate a single function test case, wherein the test system validates that a same failure is observed with the single test call. Finally, in response to the function continuing to fail in the single call case, the process includes adding an omit argument to the test case generator, and indicating which arguments to omit, wherein the single call case is repeated until a minimal set of failing arguments is identified.

According to one or more other embodiments, test cases are generated and run while information is collected that, once processed, can indicate if and what input or combination of argument inputs caused the test case failure.

According to another example, and according to one or more embodiments, a test case generator generates multiple sets. According to one embodiment the sets consist of three files per set. For example, the set of three files can includes (1) a header file containing declarations for all the called functions and declarations for all non-built-in data types (e.g. classes, structures, unions) that are used both on the caller and callee side. The set of three files can also include (2) a source file containing a single main function, which in turn contains, for each called function: Definitions of any variables to be used in the called function; Logic to perform computations on the arguments and obtain a final result value; Call to the called function with the required arguments; and Validation that the called function returns the same value from computations as the final result value computed in main. The set of three files can also include (3) a source file containing each called function, including: The full argument list and return type; Logic to perform computations on the arguments and obtain a final result value. The computations are identical to those performed in main, and the result value should be identical if all arguments were passed correctly.

According to one or more embodiments, the test case generation is controlled by a random number generator (RNG), which is seeded with a value at the start (e.g. --seed=123). An arbitrary number of functions and function calls are generated for each test case. For each new function generated, the RNG is re-seeded with the next seed value (RNG.seed (++lastseed)). Each function name consists of "Func" plus the seed number.

According to one or more embodiments, other methods for generating test cases can be implemented and the test cases can be generated with a variable number of files and arguments for use during testing.

Next, in accordance with one or more embodiments, the test cases that are generated are used to test a desired ABI of the operating system.

For example, according to one or more embodiments, the tester compiles each file into an object file, and links the main and target object files together into an executable, so that the calls between them are governed by the ABI. The tester then runs each executable. For any function call whose result does not match the result computed in main, the function name is printed, and the two sets of results are printed.

Further, according to one or more embodiments, the tester or automatic test system can regenerate test cases for each individual function that is not correct, by specifying a seed corresponding to that function name, and instructing the test case generator to generate a single function test case. The tester/automatic test system validates that the same failure is observed with the single test call.

Further, assuming the function still fails in the single call case, the tester can include additional processing that is able to reduce the arguments that the test case generator includes in the failed test case based on a reduction algorithm as described herein. Specifically, processing is provided that iteratively runs the test case with some arguments withheld and if the test case continues to fail those arguments can be omitted because they are not causing the failure. Accordingly, the process includes an omit portion that indicates which arguments to omit, omits the arguments in a test case generated by the test case generator, and repeats the process until the minimal set of failing arguments is found.

For example, according to one or more embodiments, the omit process provides that each argument can be associated with a string of characters. For example, the character can be either a "+" or a "−". A + means that the argument in that position should be included, while a − means that the argument in that position should be excluded. If the string contains fewer characters than the number of arguments generated for that function, all arguments beyond the last specified + or − are assumed to be included (i.e. "+").

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A computer-implemented method of test case reduction in application binary interface (ABI) compatibility testing, the computer-implemented method including:
    receiving, from a memory at a processor, a failed test case and a plurality of arguments that were the cause of a failure of the failed test case;
    selecting, using the processor, a first subset of arguments from the plurality of arguments, wherein selecting the first subset of arguments from the plurality of arguments comprises:
        defining a plurality of states of arguments,
        assigning each argument in the plurality of arguments a state, and
        selecting the first subset of arguments based on the state of each argument;
    running, using the processor, a copy of the failed test case without the first subset of arguments;
    omitting, using the processor, the first subset of arguments from the copy of the failed test case based on a determination that the copy of the failed test case continues to fail;
    retaining, using the processor, the first subset of arguments based on a determination that the copy of the failed test case passes indicating that the first subset of arguments contain arguments that trigger the failure;
    iteratively selecting, using the processor, a plurality of subsets of the plurality of arguments and omitting when the copy of the failed test case continues to fail until all arguments in the plurality of arguments have been screened; and
    storing, in the memory, the remaining plurality of arguments that has arguments omitted as a minimal set of arguments that cause the failure of the failed test case.

2. The computer-implemented method of claim 1, further comprising:
    generating, using the processor, a plurality of test cases that each include a function call and a target function;
    generating, using the processor, a plurality of arguments for each of the plurality of test cases;
    executing, using the processor, each of the plurality of test cases using the plurality of arguments generated for that test case;
    detecting, using the processor, a set of failed test cases from the plurality of test cases; and
    selecting, using the processor, a failed test case from the set of failed test cases.

3. The computer-implemented method of claim 1, further comprising:
    generating the copy of the failed test case based on a random number generator seeded by a seed value that was used to generate the failed test case initially.

4. The computer-implemented method of claim 3, further comprising:
    detecting a randomly generated failed test case;
    receiving the seed value of the randomly generated failed test case;
    regenerating the failed test case using the seed value; and
    storing the regenerated failed test case as the copy of the failed test case in memory.

5. The computer-implemented method of claim 1, wherein defining the plurality of states of arguments comprises:
    defining an omit state wherein an argument is known not to be required to produce a failure;
    defining an inclusive state wherein an argument is known to be required to produce a failure;
    defining a test state wherein an argument in this state is to be tested as one possibly not required to produce a test case failure; and
    defining an assumed inclusion state wherein an argument is assumed to be required to produce a failure.

6. The computer-implemented method of claim 5, wherein defining the plurality of states of arguments further comprises:
    representing the omit state by a first character;
    representing the inclusive state by a second character;
    representing the test state by a third character; and
    representing the assumed inclusion state by a fourth character.

7. A computer program product for test case reduction in application binary interface (ABI) compatibility testing, the computer program product comprising a computer readable storage medium having program instructions embodied therewith, the program instructions executable by a processor to cause the processor to:
    receive, from a memory at the processor, a failed test case and a plurality of arguments that were the cause of a failure of the failed test case;
    select, using the processor, a first subset of arguments from the plurality of arguments, wherein select the first subset of arguments form the plurality of arguments using the processor to:
    define a plurality of states of arguments;
    assign each argument in the plurality of arguments a state; and
    select the first subset of arguments based on the state of each argument;
    run, using the processor, a copy of the failed test case without the first subset of arguments;
    omit, using the processor, the first subset of arguments from the copy of the failed test case based on a determination that the copy of the failed test case continues to fail;
    retain, using the processor, the first subset of arguments based on a determination that the copy of the failed test case passes indicating that the first subset of arguments contain arguments that trigger the failure;
    iteratively select, using the processor, a plurality of subsets of the plurality of arguments and omitting when the copy of the failed test case continues to fail until all arguments in the plurality of arguments have been screened; and store, in the memory, the remaining plurality of arguments that has arguments omitted as a minimal set of arguments that cause the failure of the failed test case.

8. The computer program product of claim 7, the computer program product comprising the computer readable storage medium having program instructions embodied therewith, the program instructions executable by the processor to cause the processor to:
generate, using the processor, a plurality of test cases that each include a function call and a target function;
generate, using the processor, a plurality of arguments for each of the plurality of test cases;
execute, using the processor, each of the plurality of test cases using the plurality of arguments generated for that test case;
detect, using the processor, a set of failed test cases from the plurality of test cases; and
select, using the processor, a failed test case from the set of failed test cases.

9. The computer program product of claim 7, the computer program product comprising the computer readable storage medium having program instructions embodied therewith, the program instructions executable by the processor to cause the processor to:
generate the copy of the failed test case based on a random number generator seeded by a seed value that was used to generate the failed test case initially.

10. The computer program product of claim 9, the computer program product comprising the computer readable storage medium having program instructions embodied therewith, the program instructions executable by the processor to cause the processor to:
detect a randomly generated failed test case;
receive the seed value of the randomly generated failed test case;
regenerate the failed test case using the seed value; and
store the regenerated failed test case as the copy of the failed test case in memory.

11. The computer program product of claim 7, the computer program product comprising the computer readable storage medium having program instructions embodied therewith, the program instructions executable by the processor to cause the processor to:
define an omit state wherein an argument is known not to be required to produce a failure;
define an inclusive state wherein an argument is known to be required to produce a failure;
define a test state wherein an argument in this state is to be tested as one possibly not required to produce a test case failure; and
define an assumed inclusion state wherein an argument is assumed to be required to produce a failure.

12. The computer program product of claim 11, the computer program product comprising the computer readable storage medium having program instructions embodied therewith, the program instructions executable by the processor to cause the processor to:
represent the omit state by a first character; represent the inclusive state by a second character; represent the test state by a third character; and represent the assumed inclusion state by a fourth character.

13. A system for test case reduction in application binary interface (ABI) compatibility testing, the system comprising:
a memory having computer readable instructions; and a processor configured to execute the computer readable instructions, the computer readable instructions comprising:
receiving, from the memory at the processor, a failed test case and a plurality of arguments that were the cause of a failure of the failed test case;
selecting, using the processor, a first subset of arguments from the plurality of arguments, wherein selecting the first subset of arguments from the plurality of arguments comprises:
defining a plurality of states of arguments,
assigning each argument in the plurality of arguments a state, and
selecting the first subset of arguments based on the state of each argument;
running, using the processor, a copy of the failed test case without the first subset of arguments;
omitting, using the processor, the first subset of arguments from the copy of the failed test case based on a determination that the copy of the failed test case continues to fail;
retaining, using the processor, the first subset of arguments based on a determination that the copy of the failed test case passes indicating that the first subset of arguments contain arguments that trigger the failure;
iteratively selecting, using the processor, a plurality of subsets of the plurality of arguments and omitting when the copy of the failed test case continues to fail until all arguments in the plurality of arguments have been screened; and
storing, in the memory, the remaining plurality of arguments that has arguments omitted as a minimal set of arguments that cause the failure of the failed test case.

14. The system of claim 13, the computer readable instructions further comprising:
generating, using the processor, a plurality of test cases that each include a function call and a target function;
generating, using the processor, a plurality of arguments for each of the plurality of test cases;
executing, using the processor, each of the plurality of test cases using the plurality of arguments generated for that test case;
detecting, using the processor, a set of failed test cases from the plurality of test cases; and
selecting, using the processor, a failed test case from the set of failed test cases.

15. The system of claim 13, the computer readable instructions further comprising:
generating the copy of the failed test case based on a random number generator seeded by a seed value that was used to generate the failed test case initially.

16. The system of claim 13, the computer readable instructions further comprising:
detecting a randomly generated failed test case;
receiving the seed value of the randomly generated failed test case;
regenerating the failed test case using the seed value; and
storing the regenerated failed test case as the copy of the failed test case in memory.

17. The system of claim 13, the computer readable instructions further comprising:
defining an omit state wherein an argument is known not to be required to produce a failure;
defining an inclusive state wherein an argument is known to be required to produce a failure;

defining a test state wherein an argument in this state is to be tested as one possibly not required to produce a test case failure; and defining an assumed inclusion state wherein an argument is assumed to be required to produce a failure.

18. The system of claim 13, the computer readable instructions further comprises:

representing the omit state by a first character;
representing the inclusive state by a second character;
representing the test state by a third character; and
representing the assumed inclusion state by a fourth character.

* * * * *